(12) United States Patent
Nicoara et al.

(10) Patent No.: US 8,971,819 B2
(45) Date of Patent: Mar. 3, 2015

(54) SYSTEM FOR ANALYZING MOBILE BROWSER ENERGY CONSUMPTION

(75) Inventors: Angela Nicoara, San Jose, CA (US); Narendan Thiagarajan, Emeryville, CA (US); Gaurav Aggarwal, Palo Alto, CA (US); Dan Boneh, Palo Alto, CA (US)

(73) Assignees: Deutsche Telekom AG, Bonn (DE); The Board of Trustees of the Leland Stanford Junior University, Stanford, CA (US)

( * ) Notice: Subject to any disclaimer, the term of this patent is extended or adjusted under 35 U.S.C. 154(b) by 340 days.

(21) Appl. No.: 13/524,136

(22) Filed: Jun. 15, 2012

(65) Prior Publication Data

US 2012/0322387 A1    Dec. 20, 2012

Related U.S. Application Data

(60) Provisional application No. 61/497,598, filed on Jun. 16, 2011.

(51) Int. Cl.
| | |
|---|---|
| *H04B 17/00* | (2006.01) |
| *H04M 1/24* | (2006.01) |
| *H04W 52/02* | (2009.01) |
| *H04M 1/725* | (2006.01) |

(52) U.S. Cl.
CPC ............ *H04M 1/24* (2013.01); *H04W 52/0264* (2013.01); *H04M 1/72561* (2013.01)
USPC ...................................................... 455/67.11

(58) Field of Classification Search
CPC  H04M 1/24; H04M 1/72561; H04W 52/0264
See application file for complete search history.

(56) References Cited

U.S. PATENT DOCUMENTS

| | | | | |
|---|---|---|---|---|
| 5,764,908 | A  * | 6/1998 | Shoji et al. | ..................... 709/217 |
| 2004/0268159 | A1 * | 12/2004 | Aasheim et al. | .............. 713/300 |
| 2007/0173221 | A1 * | 7/2007 | Kang | .......................... 455/343.1 |
| 2010/0269152 | A1 * | 10/2010 | Pahlavan et al. | ................... 726/3 |

OTHER PUBLICATIONS

Balasubramanian et al., Energy Consumption in Mobile Phones: A Measurement Study and Implications for Network Applications., In Proc. of ACM SIGCOMM Internet Measurement Conference (IMC'09), Chicago, USA, 2009.*

(Continued)

*Primary Examiner* — Fayyaz Alam
*Assistant Examiner* — Mohammed Rachedine
(74) *Attorney, Agent, or Firm* — Leydig, Voit & Mayer, Ltd.

(57) ABSTRACT

A system for measuring power consumption by a mobile device corresponding to access of web pages is provided. The system includes: the mobile device, configured to access web pages via a wireless network; a power measurement device connected to a battery of the mobile device, configured to measure parameters related to power consumption; and a server, in communication with the mobile device and the power measurement device, configured to control the mobile device's access of web pages and control the power measurement device's measurement of parameters, to receive measurements from the power measurement device, and to process the received measurements so as to correlate the mobile device's access of a web page with an amount of power consumed corresponding to the mobile device's access of the web page.

14 Claims, 13 Drawing Sheets

(56) References Cited

OTHER PUBLICATIONS

N. Balasubramanian, A. Balasubramanian, A. Venkataramani. Energy Consumption in Mobile Phones: A Measurement Study and Implications for Network Applications. In Proc. of ACM SIGCOMM Internet Measurement Conference (IMC'09), Chicago, USA, 2009, pp. 1-14.

A. Rahmati, L. Zhong. Context-for-Wireless: Context-Sensitive Energy-Efficient Wireless Data Transfer. In Proc. of ACM $5_{th}$ International Conference on Mobile Systems, Applications, and Services (MobiSys'07), Puerto Rico, 2007, pp. 1-14.

A. Schulman, V. Navda, R. Ramjee, N. Spring, P. Deshpande, C. Grunewald, K. Jain, V. N. Padmanabhan. Bartendr: A Practical Approach to Energy-aware Cellular Data Scheduling. In Proc. of ACM 16th Annual International Conference on Mobile Computing and Networking (MobiCom'10), Chicago, USA, 2010, pp. 1-12.

S. Nirjon, A. Nicoara, C. Hsu, J. Singh, J. Stankovic. MultiNets: Policy Oriented Real-Time Switching of Wireless Interfaces on Mobile Devices. In Proc. of $18_{th}$ IEEE Real-Time and Embedded Technology and Applications Symposium (RTAS'12), Beijing, China, 2012, pp. 1-10.

J. Huang, Q. Xu, B. Tiwana, A. Wolman, Z. M. Mao, M. Zhang, P. Bahl. Anatomizing Application Performance Differences on Smartphones. In Proc. of ACM 8th Intl. Conf. on Mobile Systems, Applications, and Services (MobiSys'10), San Francisco, USA, 2010, pp. 1-13.

Z. Zhuang, K. Kim, J. Singh. Improving Energy Efficiency of Location Sensing on Smartphones. In Proc. of ACM 8th Intl. Conf. on Mobile Systems, Applications, and Services (MobiSys'10), San Francisco, USA, 2010, pp. 1-15.

J. Flinn, S. Park, M. Satyanarayanan. Balancing Performance, Energy, and Quality in Pervasive Computing. In Proc. of the $22_{nd}$ International Conference on Distributed Computing Systems (ICDCS'02), Vienna, Austria, 2002, pp. 1-10.

J. Flinn, D. Narayanan, M. Satyanarayanan. Self-Tuned Remote Execution for Pervasive Computing. In Proc. of the $8^{th}$ Workshop on Hot Topics in Operating Systems (HotOS), Germany, 2001, pp. 1-6.

S. Osman, D. Subhraveti, G. Su, J. Nieh. The Design and Implementation of Zap. In Proc. of the 5th Symposium on Operating Systems Design and Implementation (OSDI'02), Boston, USA, 2002, pp. 1-16.

Byung-Gon Chun, Petros Maniatis. Augmented Smartphone Applications Through Clone Cloud Execution. In Proc. of the $12_{th}$ Conference on Hot Topics in Operating Systems, 2009, pp. 1-5.

G. C. Hunt, M. L. Scott. The Coign Automatic Distributed Partitioning System. In Proc. of the 3rd Symposium on Operating Systems Design and Implementation (OSDI'99), Louisiana, 1999, pp. 1-14.

Y. Weinsberg, D. Dolev, T. Anker, M. Ben-Yehuda, P. Wyckoff. Tapping into the Fountain of CPUs—On Operating System Support for Programmable Devices. In Proc. of the $13^{th}$ International Conf. on Architectural Support for Programming Languages and Operating Systems (ASPLOS'08), Seattle, WA, USA, 2008, pp. 1-10.

E. Cuervoy, A. Balasubramanian, D-k. Cho, A. Wolman, S. Saroiu, R. Chandra, P. Bahl. MAUI: Making Smartphones Last Longer with Code Offload. In Proc. of ACM 8th Intl. Conf. on Mobile Systems, Applications, and Services (MobiSys'10), San Francisco, USA, 2010, pp. 1-14.

\* cited by examiner

SYSTEM FOR ANALYZING MOBILE BROWSER ENERGY CONSUMPTION

CROSS-REFERENCE TO RELATED APPLICATIONS

This patent application claims the benefit of U.S. Provisional Patent Application No. 61/497,598, filed Jun. 16, 2011, which is incorporated by reference.

FIELD

This invention relates to mobile devices and more specifically to power consumption during mobile web browsing.

BACKGROUND

Worldwide web browsing using browsers on mobile devices is becoming increasingly popular. For example, data gathered by NetMarketShare show that the percentage of all browsing performed on mobile devices has steadily risen over the past couple of years (see http://www.netmarketshare.com/report.aspx?qprid=61&sample=37&qptimeframe=M&qpsp=136 &qpnp=25). Many popular sites have responded by providing a mobile version of their site optimized for a small screen. However, at least partly due to a weak understanding of energy use by browsers on mobile devices, these mobile sites are often poorly optimized for energy use, causing them to inefficiently consume more of the mobile devices' power than is necessary when rendering such sites in the mobile devices' browsers.

There is a large body of work focusing on energy consumption and network activity in mobile devices. Most results focus on the phone operating system or generic phone applications.

Regarding network traffic for smartphone applications, existing research on mobile devices has provided several proposed approaches to the problem of minimizing energy consumption, such as N. Balasubramanian et al. (N. Balasubramanian, A. Balasubramanian, A. Venkataramani. Energy Consumption in Mobile Phones: A Measurement Study and Implications for Network Applications. In Proc. of ACM SIGCOMM Internet Measurement Conference (IMC'09), Chicago, USA, 2009) which reduces power consumption of data transfers, A. Rahmati et al. (A. Rahmati, L. Zhong. Context-for-Wireless: Context-Sensitive Energy-Efficient Wireless Data Transfer. In Proc. of ACM 5$^{th}$ International Conference on Mobile Systems, Applications, and Services (MobiSys '07), Puerto Rico, 2007) which chooses wireless interfaces based on network condition estimation, A. Schulman et al. (A. Schulman, V. Navda, R. Ramjee, N. Spring, P. Deshpande, C. Grunewald, K. Jain, V. N. Padmanabhan. Bartendr: A Practical Approach to Energy-aware Cellular Data Scheduling. In Proc. of ACM 16th Annual International Conference on Mobile Computing and Networking (MobiCom '10), Chicago, USA, 2010) which proposes an approach to energy-aware cellular data scheduling, and S. Nirjon et al. (S. Nirjon, A. Nicoara, C. Hsu, J. Singh, J. Stankovic. MultiNets: Policy Oriented Real-Time Switching of Wireless Interfaces on Mobile Devices. In Proc. of 18$^{th}$ IEEE Real-Time and Embedded Technology and Applications Symposium (RTAS '12), Beijing, China, 2012) and A. Rahmati et al. which dynamically switch between wireless network interfaces based on the data traffic. Several techniques have been used (e.g., bundling multiple transfers as described in N. Balasubramanian et al., switching between WiFi and 3G cellular networks as described in S. Nirjon et al. and A. Rahmati et al., and scheduling based on a dynamic programming procedure for computing the optimal communication schedule as described in A. Schulman et al.) to minimize energy consumption.

Other related measurement works include a study of the performance of 3G network and applications on smartphones, as described in J. Huang et al. (J. Huang, Q. Xu, B. Tiwana, A. Wolman, Z. M. Mao, M. Zhang, P. Bahl. Anatomizing Application Performance Differences on Smartphones. In Proc. of ACM 8th Intl. Conf. on Mobile Systems, Applications, and Services (MobiSys '10), San Francisco, USA, 2010) and Z. Zhuang et al. (Z. Zhuang, K. Kim, J. Singh. Improving Energy Efficiency of Location Sensing on Smartphones. In Proc. of ACM 8th Intl. Conf. on Mobile Systems, Applications, and Services (MobiSys '10), San Francisco, USA, 2010). J. Huang et al. show that 3G connections suffer from very long latencies and slow data transfers, which may lead to increased energy consumption. Z. Zhuang et al. present a location sensing framework to improve the energy efficiency of localization on smartphones that run multiple location-based applications. The authors present four design principles that minimize energy, i.e., accelerometer-based suppression, location-sensing piggybacking, substitution of location-sensing mechanisms, and adaptation of sensing parameters when battery is low.

Prior works in the context of partitioning applications such as J. Flinn et al. (2002) (J. Flinn, S. Park, M. Satyanarayanan. Balancing Performance, Energy, and Quality in Pervasive Computing. In Proc. of the 22$^{nd}$ International Conference on Distributed Computing Systems (ICDCS '02), Vienna, Austria, 2002.), J. Flinn et al. (2001) (J. Flinn, D. Narayanan, M. Satyanarayanan. Self-Tuned Remote Execution for Pervasive Computing. In Proc. of the 8th Workshop on Hot Topics in Operating Systems (HotOS), Germany, 2001), and S. Osman et al. (S. Osman, D. Subhraveti, G. Su, J. Nieh. The Design and Implementation of Zap. In Proc. of the 5th Symposium on Operating Systems Design and Implementation (OSDI '02), Boston, USA, 2002) investigated strategies for reducing the energy consumption of mobile phones by executing code remotely. J. Flinn et al. (2002) and J. Flinn et al. (2001) propose strategies on how to partition a program, how to handle state migration and adaptation of program partitioning scheme to changes in network conditions. S. Osman et al. and B. Chun et al. (Byung-Gon Chun, Petros Maniatis. Augmented Smartphone Applications Through Clone Cloud Execution. In Proc. of the 12$^{th}$ Conference on Hot Topics in Operating Systems, 2009) propose using full process or VM migration to allow remote execution without modifying the application code.

Several previous studies also investigated the use of automatic program partitioning. G. C. Hunt et al. (G. C. Hunt, M. L. Scott. The Coign Automatic Distributed Partitioning System. In Proc. of the 3rd Symposium on Operating Systems Design and Implementation (OSDI '99), Louisiana, 1999) develop strategies to automatic partitioning of DCOM applications into client and server components without modifying the application source code. Y. Weinsberg et al. (Y. Weinsberg, D. Dolev, T. Anker, M. Ben-Yehuda, P. Wyckoff. Tapping into the Fountain of CPUs—On Operating System Support for Programmable Devices. In Proc. of the 13th International Conf. on Architectural Support for Programming Languages and Operating Systems (ASPLOS '08), Seattle, Wash., USA, 2008) propose an approach to offload computation to specialized disk controllers and processors (i.e., NICs).

None of these references mentioned above pertain to the design of energy efficient web pages in the context of mobile web browsing. Thus, there remains a need to provide more guidance to web developers as to how to build energy efficient web pages for mobile browsing.

E. Cuervoy et al. (E. Cuervoy, A. Balasubramanian, D-k. Cho, A. Wolman, S. Saroiu, R. Chandra, P. Bahl. MAUI: Making Smartphones Last Longer with Code Offload. In Proc. of ACM 8th Intl. Conf. on Mobile Systems, Applications, and Services (MobiSys '10), San Francisco, USA, 2010) proposed a way to offload heavy computations to a server cloud and have a mobile phone display the results. In the context of web browsing, one could offload image rendering to the cloud and display the results back to the phone. However, while the back-end offloading approach described by Cuervoy et al. works well for certain applications, this approach does not improve browser efficiency.

BRIEF SUMMARY

In an embodiment, the present invention provides a system for measuring power consumption by a mobile device corresponding to access of web pages. The system includes: the mobile device, configured to access web pages via a wireless network; a power measurement device connected to a battery of the mobile device, configured to measure parameters related to power consumption; and a server, in communication with the mobile device and the power measurement device, configured to control the mobile device's access of web pages and control the power measurement device's measurement of parameters, to receive measurements from the power measurement device, and to process the received measurements so as to correlate the mobile device's access of a web page with an amount of power consumed corresponding to the mobile device's access of the web page.

BRIEF DESCRIPTION OF THE SEVERAL VIEWS OF THE DRAWING(S)

DETAILED DESCRIPTION

Despite the growing popularity of mobile web browsing, the energy consumed by a phone browser while surfing the web is poorly understood. In an embodiment, the present invention provides an infrastructure for measuring the precise energy used by a mobile browser to render web pages (e.g., the energy needed to render financial, e-commerce, email, blogging, news and social networking sites). The tools used in this embodiment are sufficiently precise to measure the energy needed to render individual web elements, such as cascade style sheets (CSS), Javascript, images, and plug-in objects.

As will be described in further detail below, results obtained using the infrastructure provided by embodiments of the present invention show that for popular sites, downloading and parsing cascade style sheets and Javascript consumes a significant fraction of the total energy needed to render the page. Data collected using this infrastructure can be used in making concrete recommendations on how to design web pages so as to minimize the energy needed to render the page. In one example, it was determined that by modifying scripts on a Wikipedia mobile site, the energy needed to download and render Wikipedia pages on mobile devices can be reduced by 30% with no change to the user experience.

Further, there exists a point at which offloading browser computations to a remote proxy can save energy on the phone which can be estimated.

Figure 1:
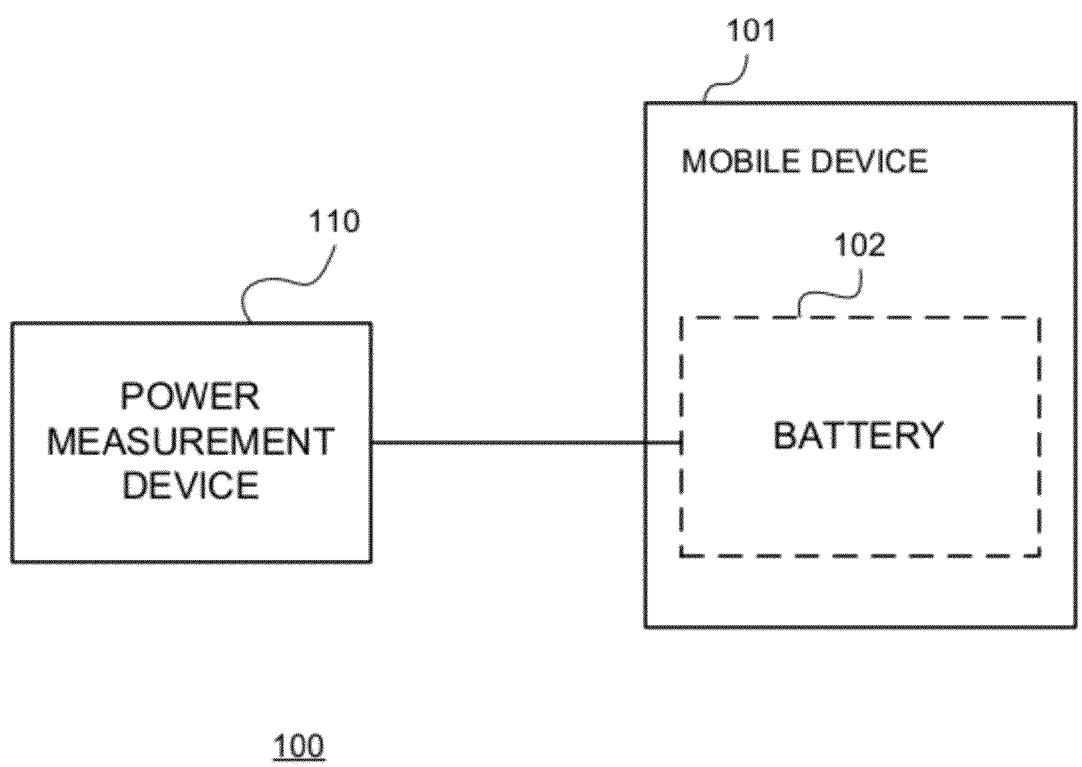
FIG. 1 shows a block diagram of a setup used for measuring energy consumption of a mobile device battery according to an embodiment.

Turning now to FIG. 1, the system setup 100 used in certain embodiments of the present invention is depicted. A power measurement device 110, such as a multimeter, is connected to a battery 102 while the battery 102 is in or attached to a mobile device 101 such that the battery 102 is providing power to the mobile device 101. Using this setup, the energy consumed by operation of the Android browser when accessing popular web sites—such as Facebook, Amazon, and many others—was analyzed.

Further, in order to precisely measure the amount of energy needed to render a page from the moment the browser begins navigating to the desired web site until the page is fully rendered, a patched version of the Android browser utilized by the mobile device was used. The patched version included modifications that allowed the measurement system to measure the exact energy needed to render a page while excluding the energy consumed by the radio of the mobile device. This setup is described in further detail below, along with a description of the energy model used for the mobile device's radio (which is similar to models presented in N. Balasubramanian et al. and A. Rahmati et al.).

This measurement system was not only used to measure the amount of power consumed when rendering entire web pages, but to measure the energy needed to render individual web elements such as images, Javascript, and Cascade Style Sheets (CSS). As will be described in further detail below, complex Javascript and CSS can be as expensive to render as images. Moreover, dynamic Javascript requests (in the form of XMLHttpRequest) can greatly increase the cost of rendering the page since it prevents the page contents from being cached. Additionally, on the Android browser, rendering JPEG images is considerably cheaper (in terms of power consumption) than other formats such as GIF and PNG for comparable size images. For example, switching all of the images from a Facebook web page to JPEG format results in considerable energy savings.

Using these energy measurements, guidelines for building energy-efficient web pages that reduce energy use on a mobile device client can be suggested. For example, by applying these guidelines to a Wikipedia mobile site, the energy consumption is reduced from 35 Joules to 25 Joules—a saving of 29%. Further, the modification that results in these savings simply changes how Javascript works on the page without affecting the user experience. The measurements provided in the present disclosure further below quantify some examples of how much energy can be saved by following these guidelines.

Additionally, beyond optimization of web page design, the measurement system described herein allows for estimation of the effectiveness of offloading browser computations to a remote server. Quantitative numbers are provided herein for an exemplary mobile device—the Android ADP2 phone, which is a modern smartphone.

In an embodiment, the present invention provides operating system support for measuring the precise energy used by a mobile browser to render web pages. Contributions and benefits achieved by the present invention include but are not limited to:

Design and implementation of a novel system for measuring the power consumption of web pages, including specific components on the page: The measurement system is sufficiently precise to measure the energy needed to render individual web elements, such as cascade style sheets (CSS), Javascript, images, and plug-in objects. This provides another dimension for evaluating mobile web sites and helps web developers build more energy efficient sites.

An extension of the Android OS: A patch modifying the default Android browser is provided in order to facilitate the measurement of the precise energy used from the moment the browser begins navigating to the desired web site until the page is fully rendered. The patch also allows for measurement of the exact energy needed to render a page excluding the energy consumed by the radio. Using this information, it was determined that, for popular sites, downloading and parsing cascade style sheets and Javascript consumes a significant fraction of the total energy needed to render the page. Further, it will be appreciated that the principles described herein are not limited to only the Android OS, but have broader applicability and can be extended into other operating system environments as well.

Guidelines and concrete recommendations can be provided regarding how to design web pages so as to minimize the energy needed to render the page based on embodiments of the present invention.

The point at which offloading browser computations to a remote proxy results in energy savings on a mobile device can be estimated based on embodiments of the present invention.

In one exemplary embodiment, the hardware and software setup is described as follows. The mobile device 101 is an Android Developer Phone 2 (ADP2), which is a 3G-enabled T-Mobile phone that uses 3G and 2.5G and is equipped with an ARM processor, 192 MB/288 MB RAM, a 2 GB MicroSD card, and an 802.11b/g WiFi interface.

Figure 2:
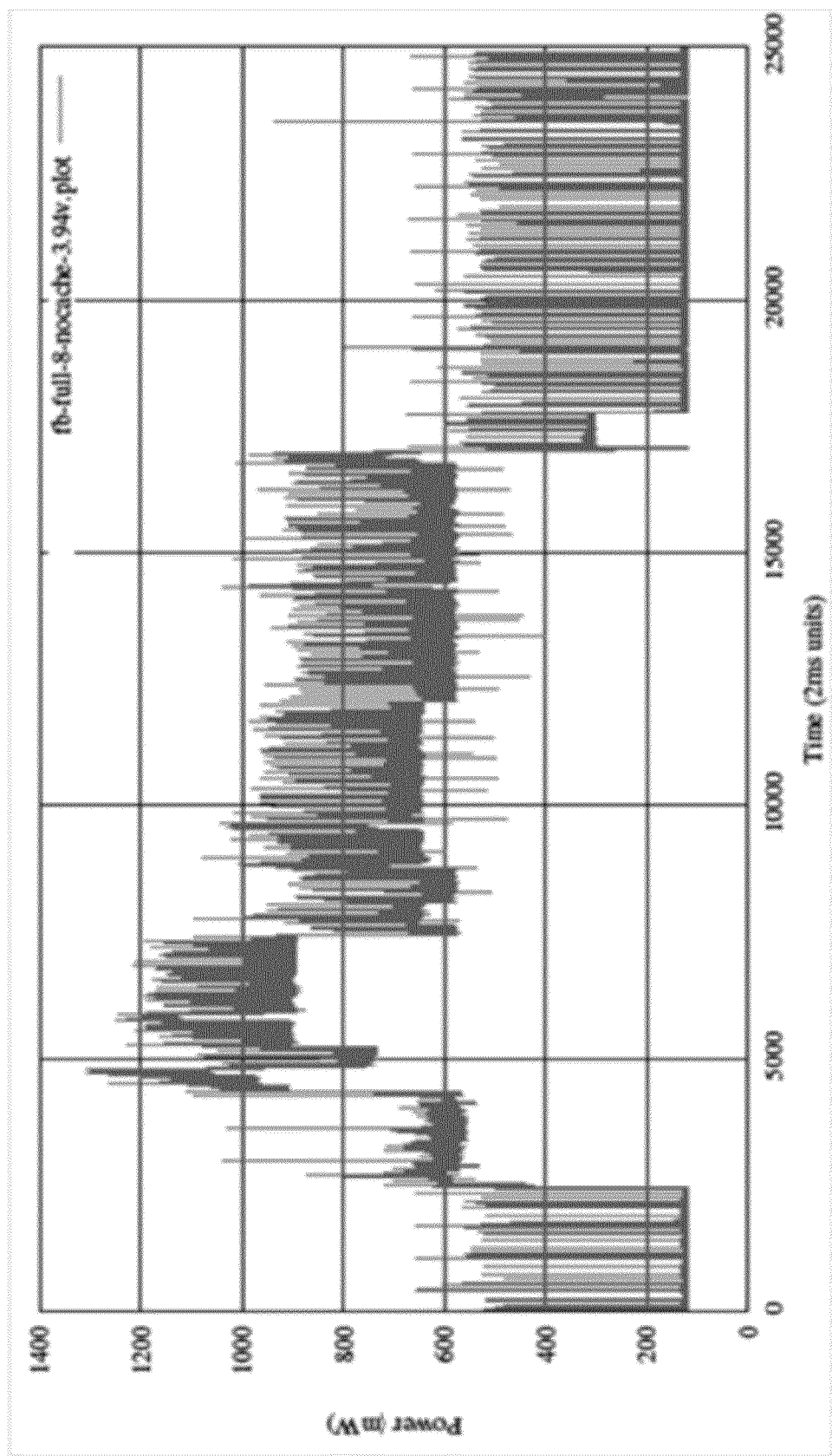
FIG. 2 illustrates an exemplary output graph corresponding to power consumed when rendering a Facebook page on a mobile device browser.

While modern mobile devices support a high level API for determining the battery charge level, this API does not provide support for obtaining precise energy use with respect to fine-grained measurements such as energy consumption corresponding to particular web pages or elements of web pages. Thus, to obtain precise measurements, a power measurement device 110 is connected to a battery 102 of the mobile device 101 as shown in FIG. 1. In an exemplary embodiment, the power measurement device 110 is the Agilent 34410A high-precision digital power multimeter. This multimeter provides fine grained measurements every 1 milliseconds (i.e., a sampling rate of 1 kHz). An exemplary power graph is presented in FIG. 2, which shows that power being measured at such a high sampling rate is able to capture browser activity.

An Android mobile device will not boot without the battery in the phone. Therefore, in the exemplary embodiment, the battery 102 was left inside the mobile device 101, and continuous power transferred from the battery to the phone was measured by the power measurement device 101. The charger for the mobile device 101 was not connected during measurement in order to prevent interference from the battery charging circuitry. To measure the energy consumption, a 0.1 ohm resistor in series with the ground was connected to the battery of an Android phone (with the battery case open). The input voltage to the phone was measured using low-level functionality of the Android operating system, and the voltage drop on the resistor was measured using the Agilent multimeter. The phone's instantaneous power consumption was calculated from the input voltage to the phone and the voltage drop on the resistor, according to the equation Power=Voltage*Current, and energy consumption was calculated according to the equation Energy=Power*Time.

Figure 3:
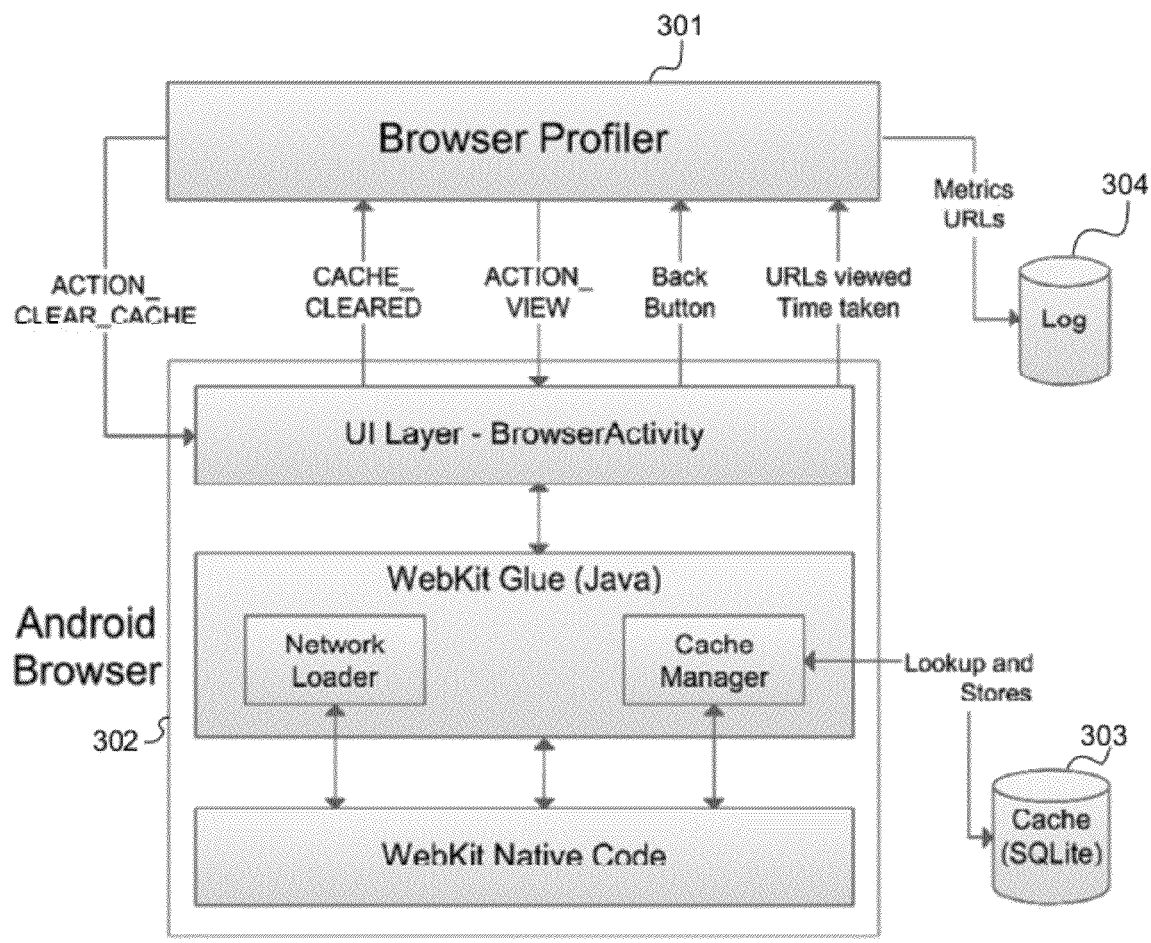
FIG. 3 shows the system architecture of the system.

In addition to the hardware setup depicted in FIG. 1, a modified version of the default Android browser was also used, which is depicted in FIG. 3. This modified browser enabled full loading of a URL P in one of two modes:

No Cache: The browser cache is emptied before starting to load the URL so that all elements of the web page are first downloaded from the network and then rendered on the phone. This mode allows for measurement of the total energy used for navigating to a web page corresponding to the URL, including 3G transmission, parsing HTML, and rendering.

With Cache: All elements of the web page are already present in the browser cache so that there is no need to use the radio of the mobile device to download any content. This mode allows for measurement of the energy needed to parse and render HTML from cache. No 3G traffic is allowed in this mode.

The software setup for measuring power consumption includes at least two components: a Browser Profiler 301, which is a custom-written Android application, and the built-in Android Browser 302 with some modifications described below. These components will be referred to as Profiler and Browser, respectively, and FIG. 3 illustrates the information flow between these components.

In an exemplary embodiment, the Measurement Workflow is described as follows. The Profiler provides a simple user interface that takes URL P and number of iterations n as input. When the user taps a button to start profiling, Profiler tells the browser to load the web page P in NoCache mode. First, Profiler instructs the browser to clear its cache 303 by sending the ACTION_CLEAR_CACHE intent as shown in FIG. 3. Browser responds by completely clearing its cache 303 and sending back the CACHE_CLEARED intent to Profiler. Both these intents are custom intents provided for the purposes of the present invention and discussed in detail further below.

Next, Profiler asks the browser to load the web page corresponding to URL P by sending the built-in ACTION_VIEW intent. Once the page load finishes, the user presses a BACK button on the Android device to transfer control back to Profiler. This process is repeated n times and represents n page loads of P in NoCache mode.

At the end of NoCache mode, all components of page P will be present in the browser cache 303. Now, Profiler asks the browser to load P again n times using same combination of ACTION_VIEW intent and BACK button as before, but this time in WithCache mode, such that the cache 303 is not cleared after every load. This corresponds to n page loads of URL P in WithCache mode.

At the end of every page load, Profiler also stores the following information to a log 304:

1. WiFi and 3G signal strength obtained using Android API.

2. Tx/Rx bytes: Number of bytes sent and received by the browser obtained using getUidTxBytes(int uid) and getUidRxBytes(int uid) functions in android.os.NetStat class.
3. Page load time and list of URLs corresponding to all components of the page that were downloaded. This information is sent by the browser after a page load completes.

The changes to the Android Browser mentioned above are described as follows. At a high level, the Android Browser consists of three layers (as shown in FIG. 3):
1. UI Layer—This contains all of the Android Activities, including the Google Chrome browser and user interface elements such as buttons, menus and corresponding event handlers.
2. WebKit Glue—This contains Java classes that maintain current state of the browser such as open tabs and acts as an intermediary between the UI Layer and native WebKit. It includes a CacheManager class which provides an interface to store and lookup pages from a SQLite-based cache 303. Also, a NetworkLoader class is used to download content from the network.
3. Native WebKit Layer—This consists of the native WebKit library which parses and renders downloaded web pages on the phone screen. It relies on the NetworkLoader and CacheManager classes to download different components of a web page. This layer also contains the Javascript engine.

To measure the precise energy used by the browser, the following modifications were made to the default Android browser.
1. Cache management: As described earlier, pages are loaded in WithCache and NoCache modes to be able to distinguish the energy used for rendering a web page from the energy used for transmission. To implement these modes, the following modifications were made to the cache management of the Android browser:

Cache everything—WithCache mode is most accurate for measuring rendering energy if all components of the web page are cached (resulting in no need for downloading any new content). CacheManager class contains the browser cache management policy and was modified so as to cache redirects containing a cookie header and HTTP responses with zero content length which are otherwise not cached. Also, Cache-Control headers, Pragma: no-cache and Expires header field in any HTTP response were ignored.

Clear cache programmatically—Browser contains a preference option to clear the cache that can only be set manually (in the default browser). Since Profiler is used to make measurements, a custom Android intent called ACTION_CLEAR_CACHE was provided. As described earlier, Profiler issues this intent to the browser which acts upon it by clearing its cache. Further, another intent CACHE_CLEARED was added to serve as a callback from the browser to Profiler to inform that cache has been cleared so that it can continue with the next measurement.

Handle "changing" URLs—Occasionally, GET requests come with varying parameters. For example, while loading www.google.com, the browser downloads http://www.google.com/m/gn/loc?output=json&text=87135 and caches the result. However, when loading the same page from cache, the browser tries to download a slightly different URL—http://www.google.com/m/gn/loc?output=json&text=94219. Since the value of the text parameter is different from the cached copy, cache lookup fails and a network request is issued. As a workaround, all such "changing" URLs were identified, and the browser code was modified to ignore the GET parameters in cache lookup. This suppressed network traffic for these pages. It will be appreciated that simply turning off 3G radio was not a workable alternative, because pages do not render with the 3G radio turned off.

2. Intercept Page Load: When recording samples using the power measurement device as described above, there should be minimal interaction with the phone to ensure accurate measurements. To achieve this, the browser was modified so as to ask for the user's permission to start loading a web page by displaying a dialog and to suspend all browser activity until it obtains the permission. A simple process is followed for taking measurements: the user enters a URL to measure and hits load on the browser; Browser will display the dialog and wait for user to press "ok"; then, the power measurement device is set up and the recording of samples is triggered; and finally, the user hits "ok" on the dialog to start loading the web page while the power measurement device is recording.

3. Track metrics. Browser keeps a list of all component URLs that are downloaded over the network as part of rendering the page. It also tracks the time taken to load the entire web page. Once the page load completes, it sends this list of downloaded URLs and page load time to Profiler which logs them to a file. When a page is being loaded from cache, this list of URLs should be empty.

These modifications to the browser do not change the browser's energy profile. Clearing the cache programmatically does not modify the code path for loading a web page. Changes to cache everything mainly involve commenting out code that checks for Cache-control headers, Expiry header field etc. The other modifications, such as tracking metrics and string comparisons during cache lookup, have negligible impact on browser energy use.

As described above, the energy measurement system requires user involvement to take each measurement. In a further embodiment, the process is automated by using an SCPI programming interface on a multimeter (the power measurement device) to facilitate the performance of a large number of measurements.

Figure 4:
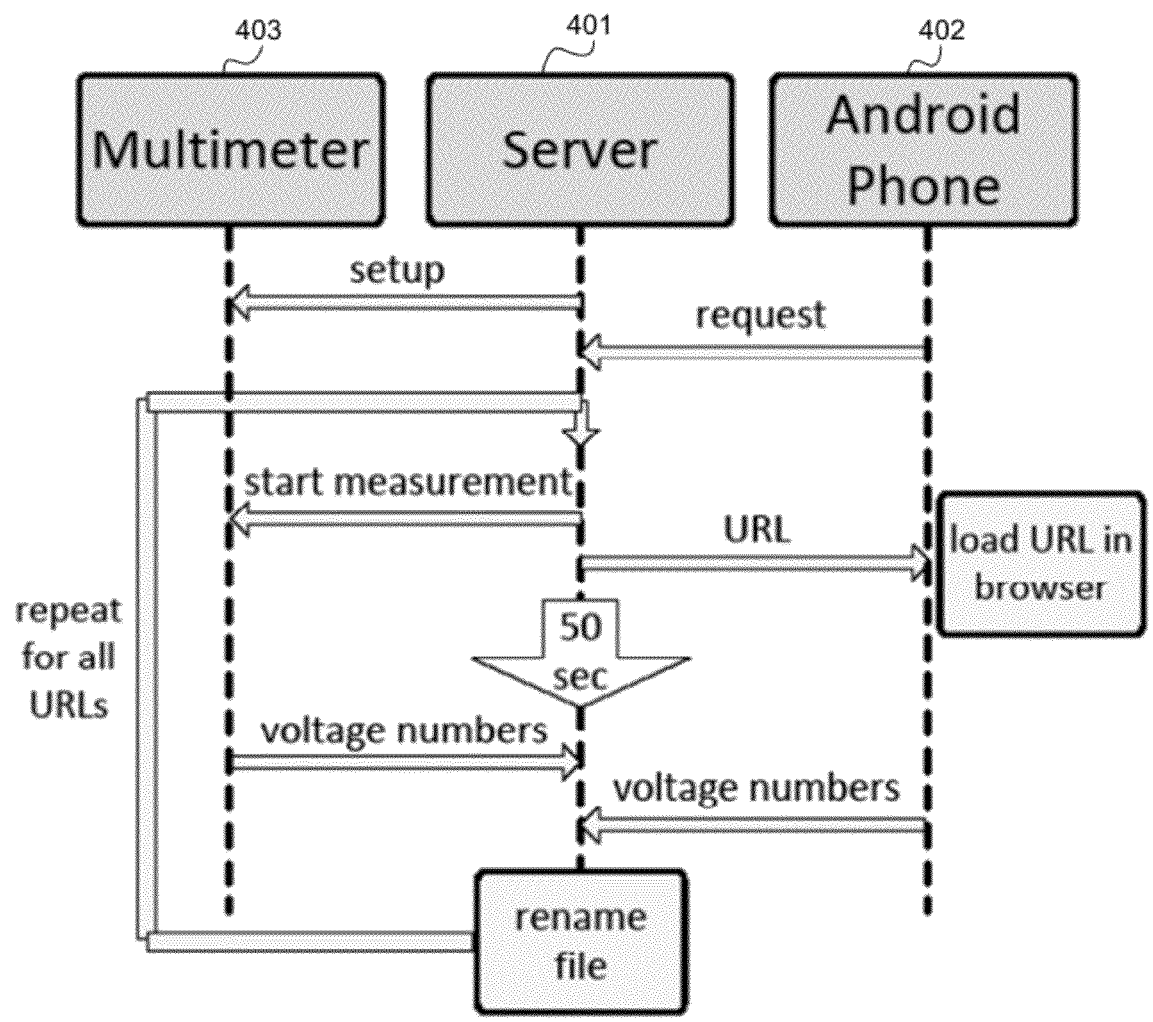
FIG. 4 shows the automated energy management system.

In an exemplary embodiment, the automated energy measurement system is depicted in FIG. 4 and includes the following components: a Server 401, an Android Phone (client) 402, and a Multimeter 403. The interaction between these components is also shown in FIG. 4.

The server 401 controls the phone (client) 402 and the multimeter 403, telling it when to start, stop and save the measurements. The server 401 communicates with the Browser Profiler application on the phone 402. The server 401 instructs this application to request the running phone browser to repeatedly load a specific URL, either with or without caching.

During this process the server 401 also starts the multimeter measurement. The server 401 communicates with the multimeter 403 using SCPI commands. Due to the limitations set by SCPI commands, the highest sampling rate achievable for the measurements is 2.5 kHz (i.e. 2500 measurements per second). All measurements recorded on the multimeter 403 during a sampling period are transferred to the server 401 for processing (e.g., at the end of the sampling period).

In a further embodiment, the browser is modified to contain a single tab so that all loads take place on the same tab. After loading each URL, the browser is navigated to an empty page so that all measurements start with the browser in the same state. The server-client communication takes place over 3G. It will be appreciated that the phone is not connected to a computer via USB because a USB starts charging the phone, rendering the measurements unusable.

The energy measurements provided herein use the units Joules or millijoules. However, to provide a frame of reference and to make sense of these numbers, the energy usage is also described in terms of a fraction of the total battery capacity. In one example, to determine the battery's energy capacity in Joules, the multimeter was run for 250 seconds while sampling the power consumption every 5 milliseconds. During these 250 seconds, the phone was stressed by constantly browsing random web pages. At the end of the 250 seconds, it was observed that a total energy use of 229.88 Joules resulted in a 7% drop in battery charge. Thus, in this example, 1% of a fully charged battery was approximately 32.84 Joules.

Figure 5:
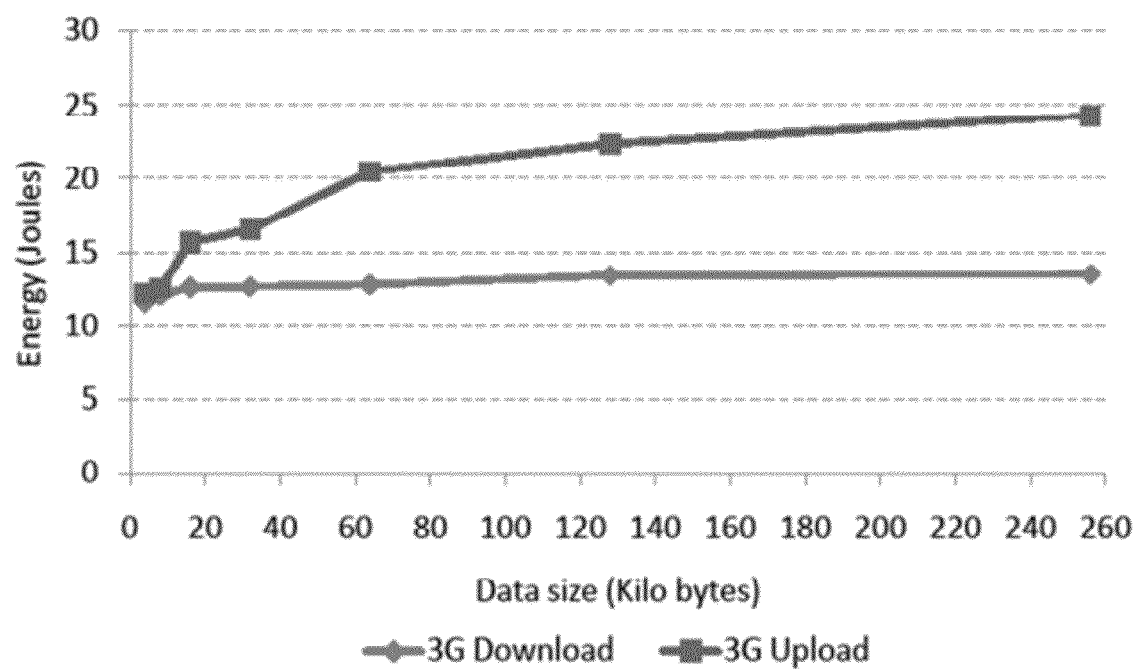
FIG. 5 shows the energy consumption over 3G (download and upload).

Additionally, to provide accurate energy consumption corresponding only to the loading of web pages, the amount of energy consumed by the 3G radio should be taken into account. To better understand the energy consumed by the 3G radio, the energy needed to setup a 3G connection with the base station and the energy needed for varying payload sizes was measured. FIG. 5 shows the average energy needed for downloading and uploading 4, 8, 16, 32, 64, 128, and 256 kB over 3G. All measurement results were averaged over five runs and the standard deviation is less than 5%. In all measurements the display brightness was set to the minimum level. Additionally, the average idle power on the device was measured and found to be 170 millijoules per second, and this average idle power was subtracted from the measurements shown in FIG. 5. FIG. 5 shows two important facts about 3G behavior. First, for both download and upload there is a high setup cost of roughly 12 Joules before the first byte can be sent. Second, once the connection is established, the energy needed to download data is mostly flat, which means that roughly the same energy is used no matter how much data is downloaded (up to 256 KB). The situation is a little different for uploading data, where the energy increases with the amount of data being uploaded. These observations are consistent with the earlier referenced work by N. Balasubramanian et al. and A. Rahmati et al.

It will be appreciated that the procedures used to generate the data shown in FIG. 5 utilized separate measurement of upload activity and download activity. That is, the upload numbers in FIG. 5 were obtained by sending data from the phone and not using the radio for any other tasks. The download numbers were similarly obtained. A web browser, however, simultaneously sends HTTP requests and receives HTTP responses using multiple threads as it requests and receives the various components that make up a web page. One might conjecture that the energy needed to send 16 kB and then receive 16 kB is the sum of the energies for uploading and downloading 16 kB shown in FIG. 5. However, this conjecture is incorrect. Trials showed that a mild interleaving of uploads and downloads is essentially dominated by the cost of the upload plus a relatively small quantity. More precisely, suppose a 1 kB chunk is uploaded and downloaded eight times (that is, total of 8 kB is uploaded and a total of 8 kB is downloaded at 1 kB per iteration without incurring setup costs between each iteration). The total energy used is only 5% more than the energy needed to directly upload 8 kB of data. Hence, the upload and download energies in FIG. 5 should not be summed to estimate the radio energy used by a web page. Instead, for mild interleaving the cost is dominated by the upload energy. It will be appreciated that the 3G setup cost is only incurred once.

When we repeated the experiment with a larger number of repetitions (e.g., 256 iterations of uploading and downloading 1 kB chunks) the energy used by the radio grew to more than the sum of the corresponding upload/download energies. This suggests, and our experiments confirm, that FIG. 5 should not be used when there are many round trips (i.e., when loading a web page requires data to be uploaded and downloaded concurrently in parallel). Thus, in summary, the data shown in FIG. 5 can be used to model applications that mostly use one-way communication such as streaming video. For Web traffic, that interleaves uploads and downloads, it can be quite difficult to define an energy model that accurately predicts the 3G energy needed to fetch a web page since energy use depends on the precise shape of the traffic. Thus, embodiments of the present invention do not rely on a model to estimate the radio energy needed to fetch a web page. Rather, by rendering web pages from a locally stored cache (as described above and below), the amount of energy needed for rendering can be isolated from the amount of 3G energy needed for retrieving the page.

Figure 6:
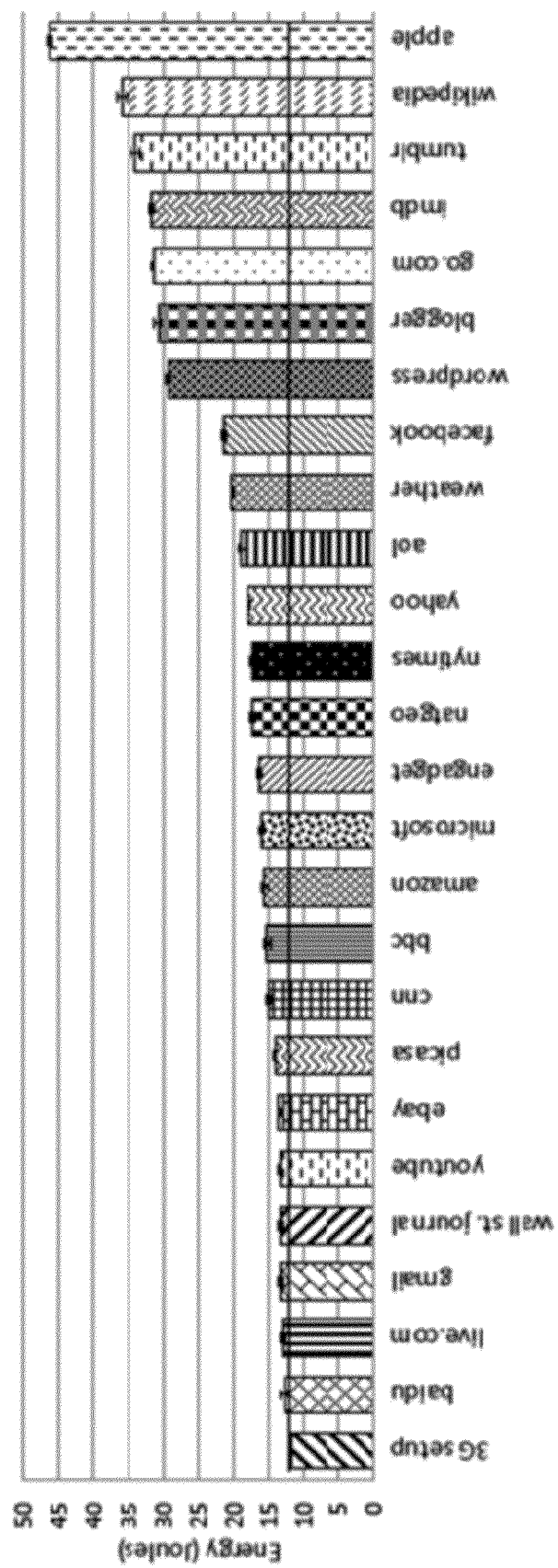
FIG. 6 shows the energy consumption of top web sites.

Using the infrastructure in accordance with the exemplary embodiments described above, numerous insights regarding energy consumption corresponding to mobile web sites and elements of those web sites was obtained. In a first experiment, the energy consumption caused by accessing web pages from several popular sites was measured, including sites representing the video, product and financial sectors. The complete list of sites analyzed is shown in Table 1 along with the amount of traffic in bytes needed to request and download the page. Table 1 also shows the energy needed to download and render the page as a fraction of a fully charged battery (computed using the battery measurements from Section 5.1.4). A summary of the energy consumed by a mobile device accessing these sites is shown in FIG. 6.

TABLE 1

Web sites used in measuring energy consumption

| Web site | Comment | % Battery life | Traffic (bytes) Upload | Download |
|---|---|---|---|---|
| m.gmail.com | inbox | 0.41 | 9050 | 12048 |
| m.picasa.com | user albums | 0.43 | 8223 | 15475 |
| m.aol.com | portal home | 0.59 | 11927 | 37085 |
| m.amazon.com | product page | 0.48 | 9523 | 26838 |
| mobile.nytimes.com | US home page | 0.53 | 15386 | 66336 |
| touch.facebook.com | facebook wall | 0.65 | 30214 | 81040 |
| mw.weather.com | Stanford weather | 0.62 | 38253 | 134531 |
| apple.com | home page | 1.41 | 86888 | 716835 |
| m.imdb.com | movie page | 0.97 | 30764 | 127924 |
| m.microsoft.com | home page | 0.49 | 15240 | 47936 |
| m.natgeo.com | home page | 0.53 | 13877 | 76742 |
| m.wikipedia.org | article page | 1.09 | 43699 | 308832 |
| bbc.com | mobile home page | 0.46 | 20505 | 67004 |
| m.ebay.com | product page | 0.42 | 8041 | 17941 |
| m.yahoo.com | portal home | 0.55 | 14397 | 45564 |
| m.youtube.com | home page | 0.55 | 5704 | 20329 |
| baidu.com | search page | 0.39 | 2108 | 3951 |
| blogger.com | home page | 0.94 | 45382 | 427788 |
| m.cnn.com | headlines page | 0.46 | 9311 | 33844 |
| m.engadget.com | portal page | 0.50 | 23334 | 80432 |
| m.go.com | start page | 0.96 | 27965 | 154278 |
| m.live.com | personal page | 0.40 | 7319 | 12576 |
| wordpress.com | home page | 0.90 | 23318 | 205140 |
| tumblr.com | home page | 1.03 | 40543 | 889242 |
| m.wsj.com | news page | 0.41 | 4058 | 13653 |

In an exemplary embodiment, to measure the total energy used to download and render the page, the phone's average energy consumption when the browser is idle was first determined to be 170 mJ/sec. Then the web pages to be measured are downloaded and saved in a remote server running Apache web server. The Browser Profiler application was then used to measure the energy consumption from the moment the browser begins processing the navigation request until the page is fully rendered. Each measurement was repeated up to ten times. The difference between the idle energy measurement and the energy when processing the request is the (average) total energy used to download and render the page. This includes the energy needed for 3 G communication and for parsing and rendering the page, but does not include the phone's idle energy consumption. The resulting numbers are shown in FIG. 6. It will be appreciated that the error bars are so small that they are barely visible.

The left most column in FIG. 6 shows the energy needed to set up a 3G connection and download a few bytes without any additional processing. Since all navigation requests begin with the setup of a 3G connection, the differences between the energy consumptions corresponding to each website are better compared by looking to the parts of the bars in FIG. 6 that are above the basic 3G setup energy consumption line.

FIG. 6 is generated from the mobile versions of the web sites shown. The exceptions are apple.com, tumblr.com, blogger.com and wordpress.com, which do not have a mobile web site. As a result, the amount of data needed (and energy consumed) to retrieve these sites is significantly higher than for other web sites having mobile versions. For example, Apple's page contains many images, including a 26 kB welcome image, that is inefficient for display on a mobile device since a mobile device scales the image down to fit a small screen.

Next, the energy needed to parse and render the page minus the energy consumed by the radio is determined, which involves a determination of how the complexity of a web page affects the energy needed to render it. To measure the rendering energy, the browser is forced to locally cache all web content (as described above), and then the amount of energy used to render the content from local cache is measured. To make this measurement, it is ensured that:
  1. There was no network traffic while rendering from local cache, and
  2. The cached data was identical to data fetched from the web site, that is, the browser did not pre-process the data before caching it.

Figure 7:
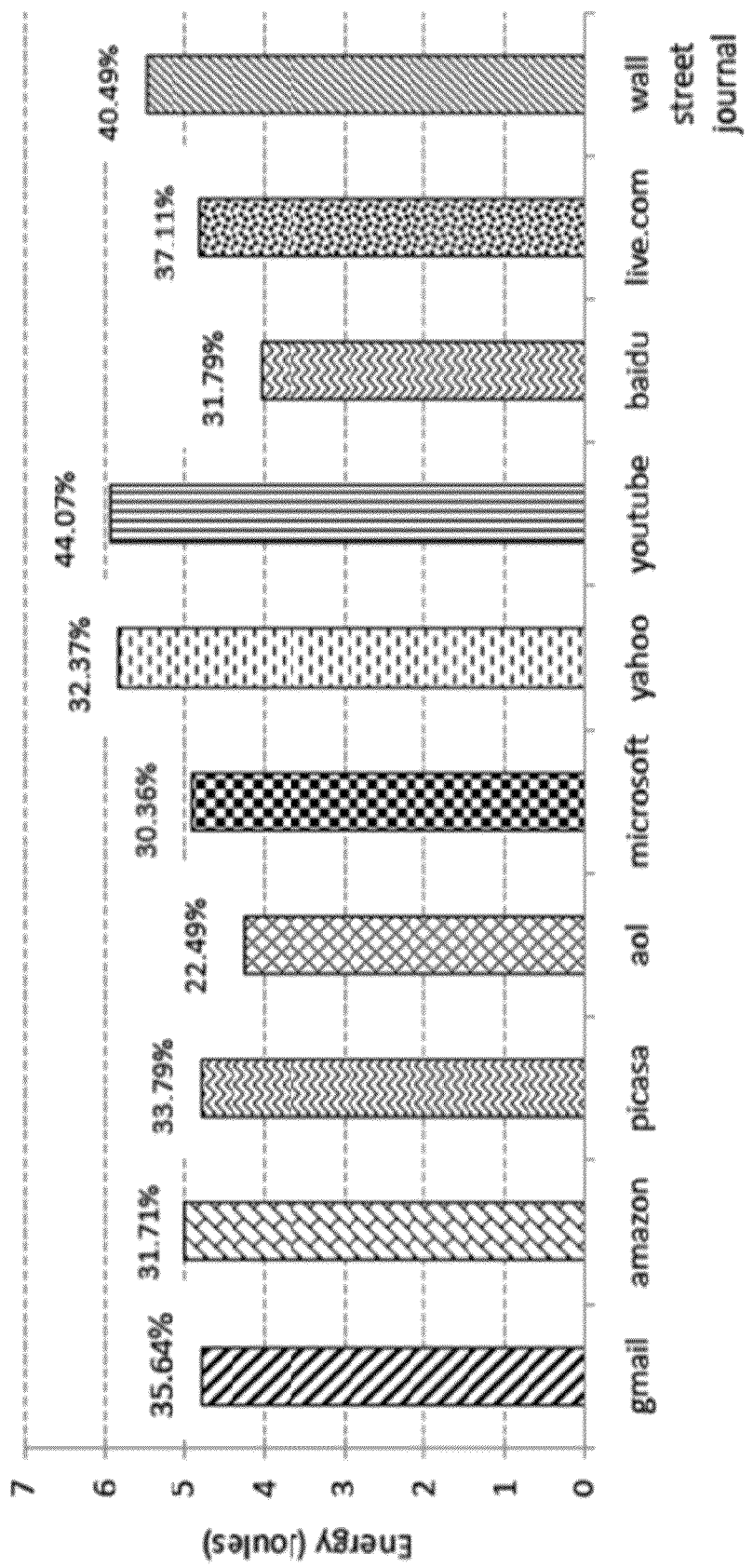
FIG. 7 shows the rendering energy of top websites from cache.

FIG. 7 shows the amount of energy used to parse and render the page when all contents are already in memory. The percentages above the bars show the energy to render the page as a percentage of the total energy consumed to download and render the page.

It will be appreciated that FIG. 7 only includes 10 of the 25 sites depicted in FIG. 6 because caching web content did not prevent network traffic for the remaining 15 sites. The Javascript and CSS utilized by these 15 sites generated dynamic web requests that could not be cached ahead of time. On the Apple home page, for example, the Javascript used for tracking user location generates an update forcing the phone to setup a 3G connection. Thus, despite caching, energy consumption for these 15 sites was almost as high as when no caching took place. There is an important lesson here for mobile web site design—dynamic Javascript can greatly increase the power usage of a page (as discussed in further detail below).

FIG. 7 shows that mobile sites like baidu, that are mostly text with very little Javascript and no large images, consume little energy to render. On the other hand, a site like Amazon, which contains product images, requires more energy. Sites like youtube and yahoo—that contain images, Javascript, and CSS—take considerably more energy to render. The precise reason for these differences will be discussed in further detail below.

Figure 9:
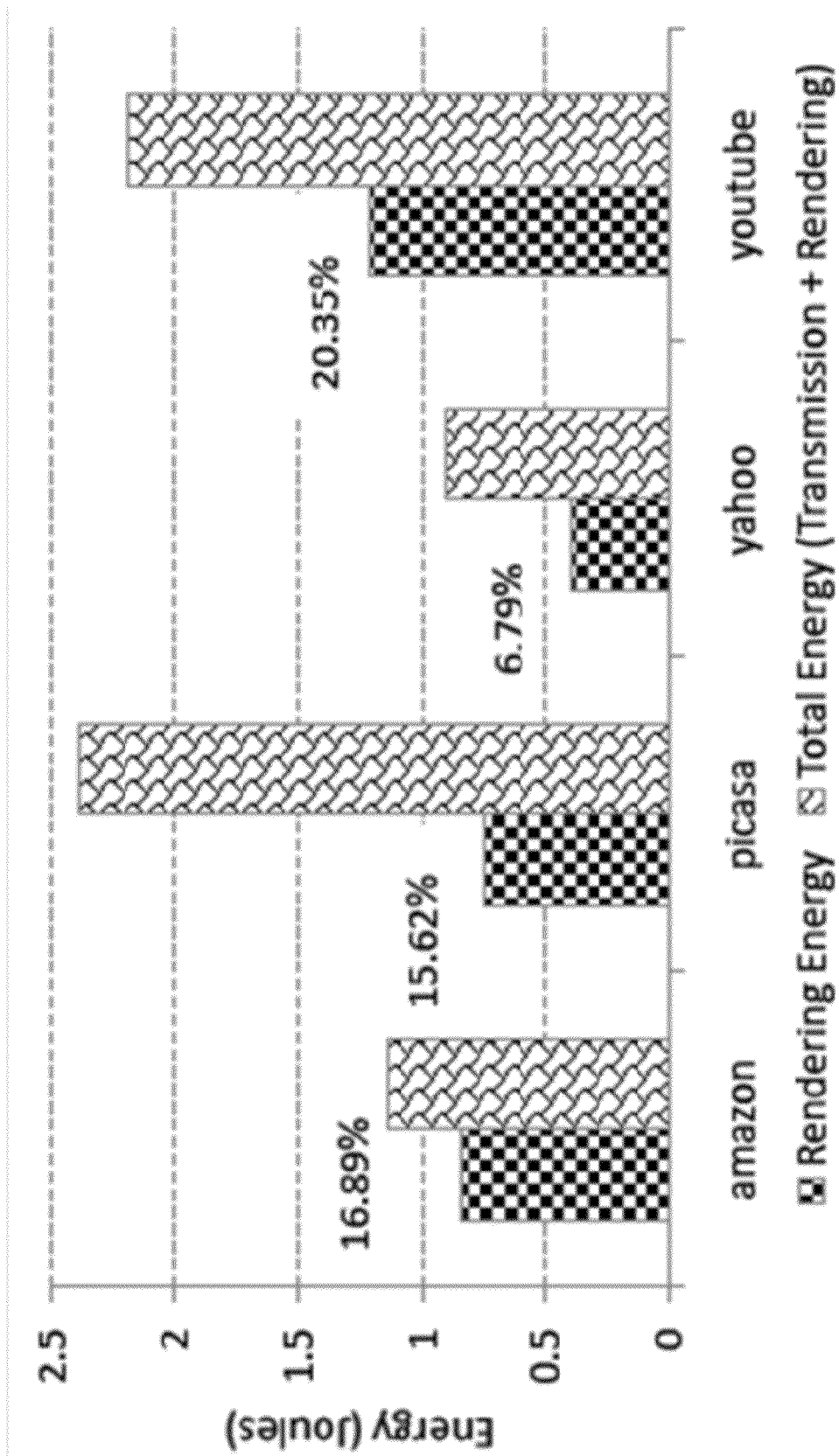
FIG. 9 shows the energy consumption of Javascript.

The energy consumption of individual web elements such as images, Javascript, cascade style sheets (CSS), etc. was also examined. The question was how much energy is used by different web elements. To measure the energy used by a particular element, a copy of each web page was created on a server. Using this copy of the web page, and a modified copy of the web page with a particular component removed (e.g., by commenting it out), the energy consumed by loading and rendering the entire page could be compared to the energy consumed by loading and rendering the entire page minus the particular component. The difference between the two numbers gives an estimate for the energy needed to present the component. These experiments were run on the web sites shown in FIG. 7 that contain specific components (FIG. 7). For example, FIG. 9 shows the energy consumed by loading and rendering a Javascript component. As previously described, the total energy used for loading and rendering each component, which includes both rendering and transmission energy, was measured first. Then, the parsing and rendering energy was measured alone by forcing the browser to cache all content locally on the phone.

Figure 8:
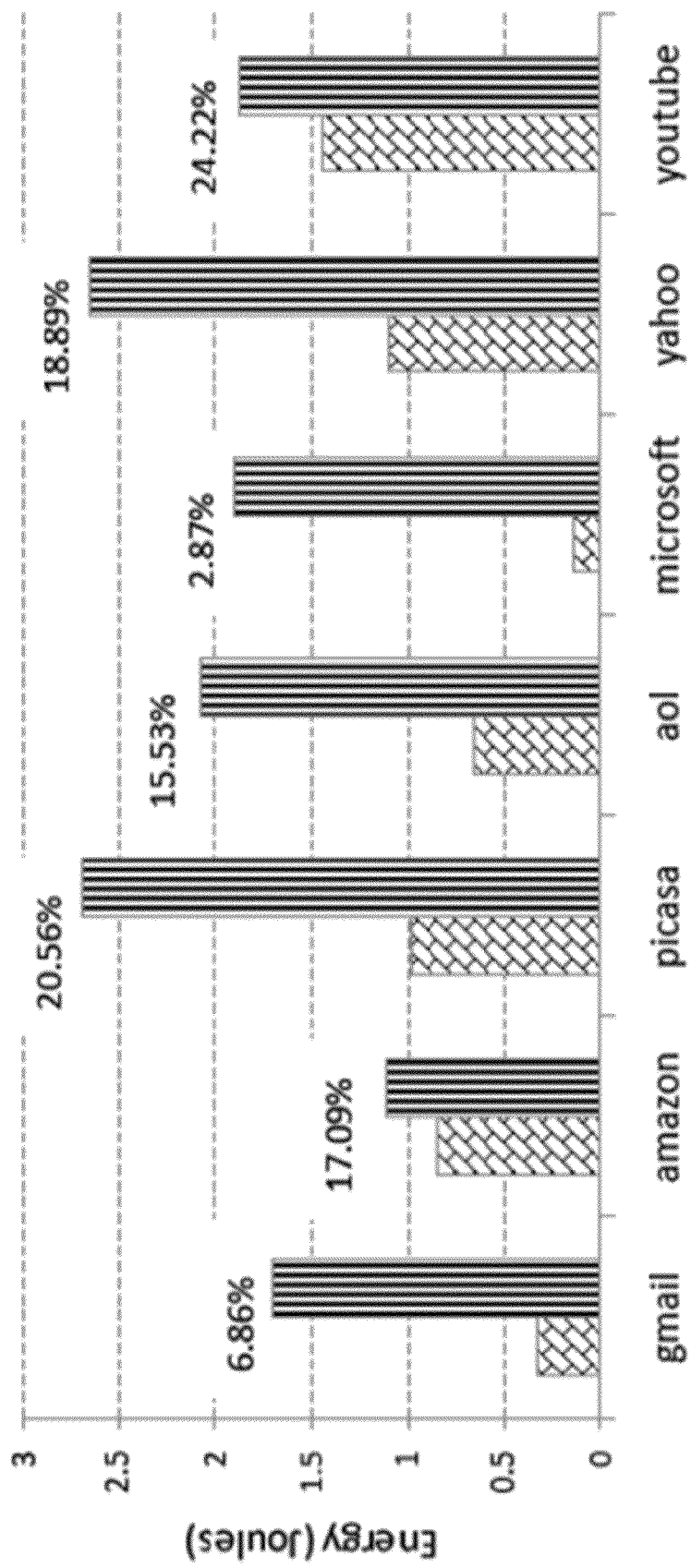
FIG. 8 shows the energy consumed by images. The percentage numbers refer to the total energy needed to render images as a fraction of the energy for rendering the entire page.

FIG. 8 shows energy measurements for images on web pages. The bars on the right correspond to the total energy spent on images. The bars on the left show the rendering energy for cached images. The percentage above the left bar shows the energy spent on rendering images as a fraction of the energy for rendering the entire page from cache. As expected, rendering images takes a significant fraction of the total rendering energy. Some sites like Youtube spend around quarter of their rendering energy on images. The amount of energy used to render images is proportional to the number and size of images on the page. The Youtube page has 5 large images representing a screenshot from each video which is why 24.22% of the total energy to render the page is spent on images. Gmail, in contrast, contains only small GIFs (13 pixels wide) and images take a smaller fraction of the total energy (6.86%). One small GIF on the Gmail page is repeated 16 times. This GIF indicates whether an email was sent to a single recipient or a group. Picasa spends a large fraction of its rendering energy (20.56%) on images because the user album page contains 8 large album cover images.

FIG. 9 shows similar measurements for Javascript on web pages. Of the cachable websites depicted in FIG. 7, only Amazon, Picasa, Youtube and Yahoo have Javascript. Amazon consumes 16.89% of its rendering energy for handling Javascript. The reason for the large rendering cost is a large and complex Javascript file. Many of the Javascript functions in the file are not used by the page but loading and processing the entire Javascript file consumes a lot of energy. Yahoo's Javascript code is embedded in the HTML page. The amount of Javascript code is very small but the code gets executed every time the page loads. As a result Javascript processing takes only 6.79% of the total rendering energy. The Javascript code here is minimal and fully used in the page. Youtube's Javascript is embedded but is so heavy that it takes 20.35% of the total energy.

Figure 10:
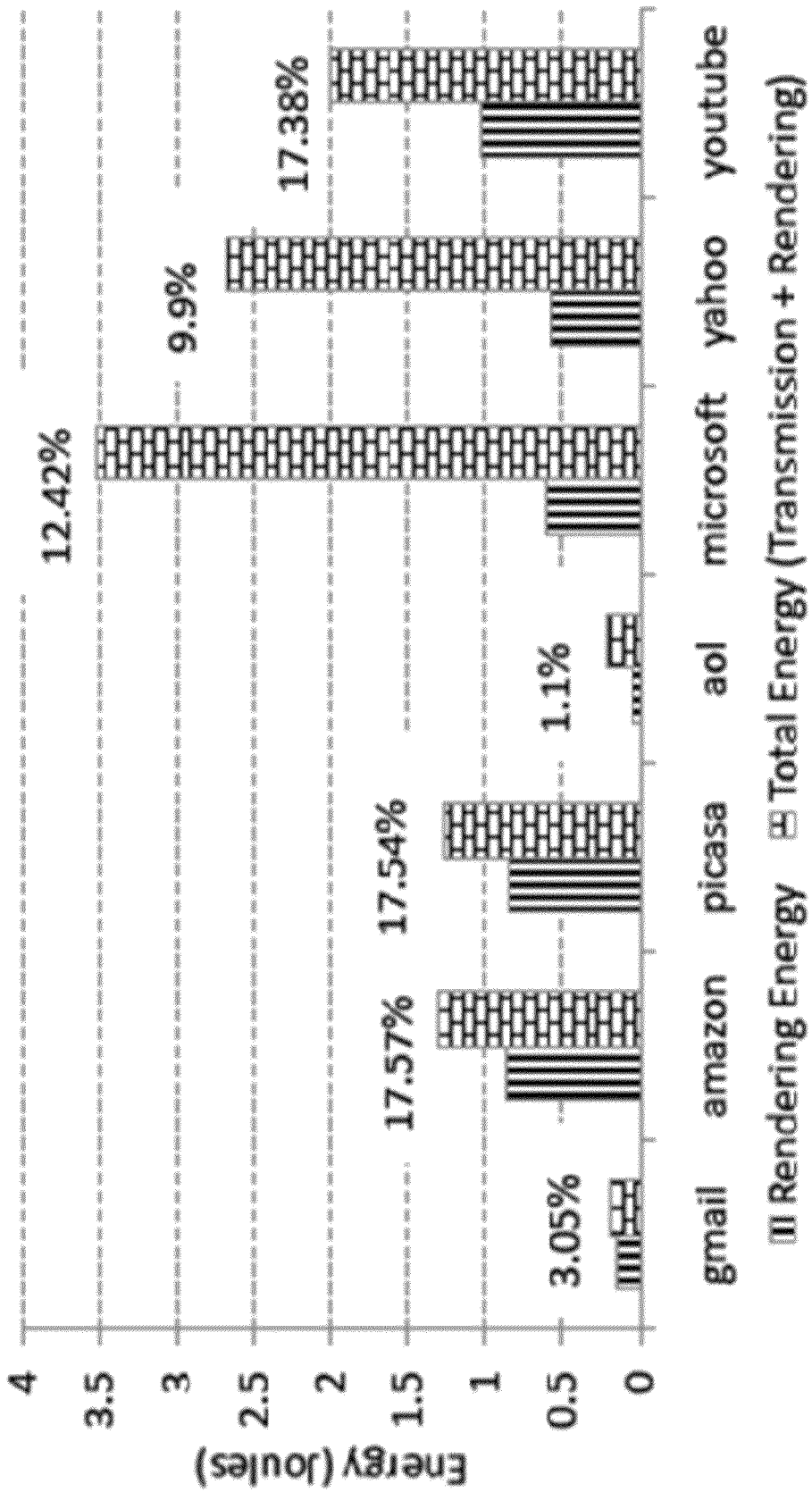
FIG. 10 shows the energy consumption of cascade style sheets.

FIG. 10 shows energy measurements for CSS. The rendering cost of CSS depends on the number of items styled using CSS. Amazon has a high CSS rendering cost (17.57%) since about 104 items in the page use styling defined in the CSS file. Amazon also has complex styling in the page like a color fade out effect, horizontal bars to show product ratings, and huge wide buttons. Gmail has simple styling defined in an internal style sheet. The CSS is very small and it consumes only 3% of the total rendering energy. AOL and Picasa both contain large images but the CSS energy consumption for AOL is much lower than Picasa's. The reason is that AOL uses HTML tables to position its images while Picasa uses CSS to position images. This nicely illustrates how positioning using CSS is less energy efficient than positioning using simple HTML tags. Microsoft and Yahoo pages use large CSS files that cause a very high transmission energy cost to download the file.

Figure 11:
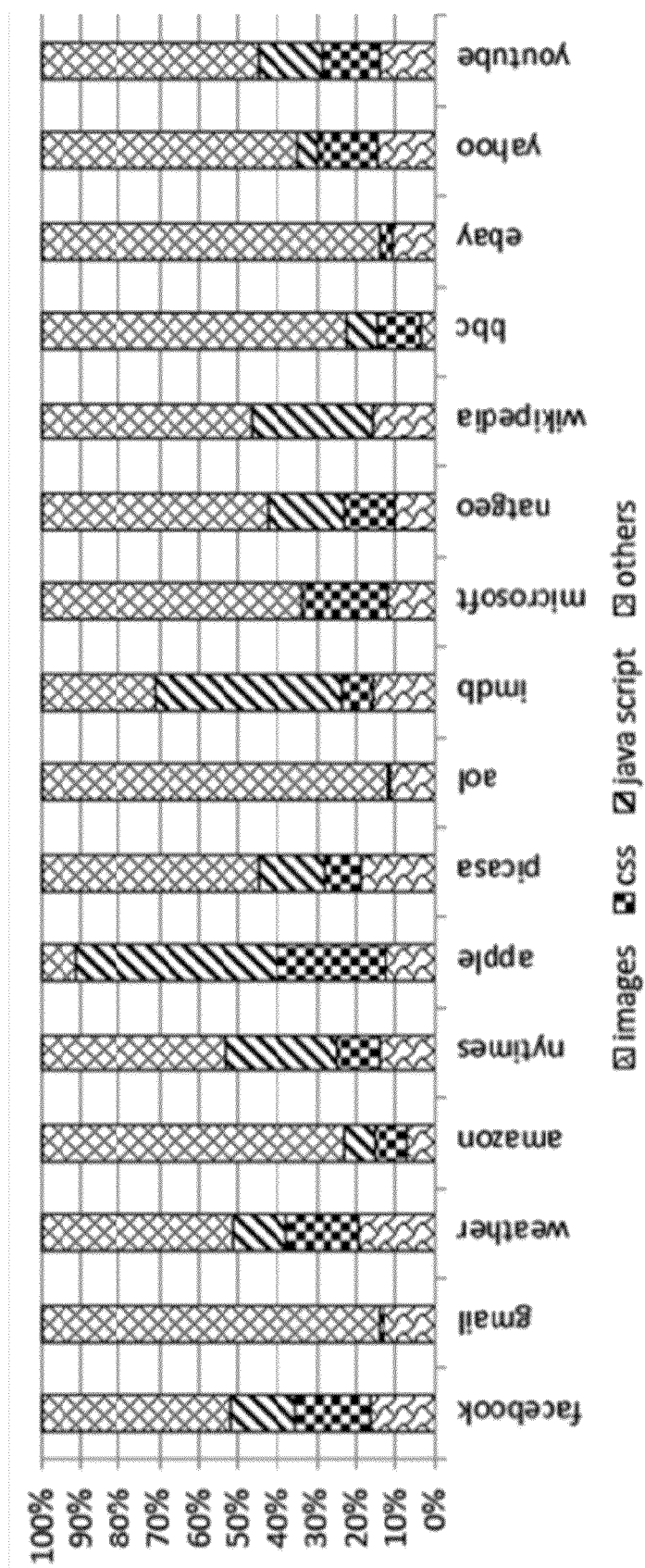
FIG. 11 shows the total energy consumption of web components (Transmission+Rendering).

FIG. 11 shows the relative costs of individual components and the relative energy consumed for each site corresponding to each type of web component. The general trend across the web sites listed in FIG. 11 is that CSS and Javascript are the most energy consuming components in the transmission and rendering of a site. The value of the "others" part in the bars of the graph mainly includes the 3G connection setup cost and text rendering. Sites that have high "others" sections (such as AOL, Ebay and Gmail) can become more efficient as wireless technology improves and connection setup cost decreases. Sites with low "'others" (such as Apple and IMDB) spend much of their energy on web elements and will not gain much from improvements in wireless technology. Thus, FIG. 11 provides another method for comparing web site efficiency.

Power hungry web components include images, Javascript, and CSS. Thus, optimization of web pages should involve reducing the power consumption of these elements.

Javascript is one of the most energy consuming components in a web page. FIG. 9 shows a high download and rendering energy required by most of the websites for Javascript. This is mainly because these webpages load large Javascript files for rendering the web page even though not all of the script is used by the page. For example, the download and rendering of Javascript in the Wikipedia page takes about 10 Joules. This is about 30% of the total energy to download and render the page.

For example, the Wikipedia webpage has two Javascript files linked to the page—application.js and jquery.js. The application.js is the Javascript specific to the Wikipedia site and the jquery.js is the generic jquery Javascript library. In the Wikipedia page each section of the page like Introduction, Table of Contents, etc. can be collapsed and expanded by the click of a button above each section. The Javascript in jquery.js is used primarily for a single purpose—to dynamically identify the correct section based on the id of the button clicked. But loading this Javascript into the memory alone takes 4 Joules. Redesigning the page with a different Javascript proved that this energy consumption was avoidable. In this alternative redesign, each text section and button are given the same id, and the Javascript function uses document.getElementById( ) to get the right section and element. value=show/hide is used. The application.js is now replaced by this simple Javascript. In cached mode, it was found that this modified Wikipedia page renders with 9.5 Joules. Just adding the application.js and jquery.js files as link to the page increases the energy consumption to 15 Joules. This example shows that shrinking Javascript on a mobile page to contain only functions used by the page greatly reduces energy use. Using generic Javascript libraries simplifies web development, but increases the energy used by the resulting pages.

Similar to the previous example, it was found that large CSS files with unused CSS rules consume more than minimum required energy. For example, Apple consumes a large amount of energy to download and render CSS (see FIG. 10). The total energy to download and render CSS of this page is around 12 Joules. This is because the Apple home page requires 5 different CSS files containing different rules used in the page. Modifying the Apple site by replacing multiple CSS files with just one CSS file containing just the rules required by the page resulted in an energy drop of 5 Joules. This is about 40% of the total CSS energy consumed by Apple. This energy can be saved by using a CSS file with only the required CSS rules. This shows that like Javascript, CSS file should be page specific and contain only the rules required by the elements in the page.

Additionally, web pages use a variety of image formats, with JPEG, GIF, and PNG being the most common. Since the energy needed to render an image depends on the encoding format, it was informative to compare the energy signature for these three predominant formats. GIF format supports 8-bits per pixel and uses the Lempel-Ziv-Welch (LZW) lossless data compression method. PNG is similarly a bitmapped image format that was created to improve upon and replace GIF. PNG also uses lossless data compression. JPEG is another popular image format using lossy data compression. On the mobile web sites, GIFs were mostly used for very small images such as small arrows and icons, PNGs were used for medium size images such as banners and logos, and JPEGs were used for large images.

Figure 12:
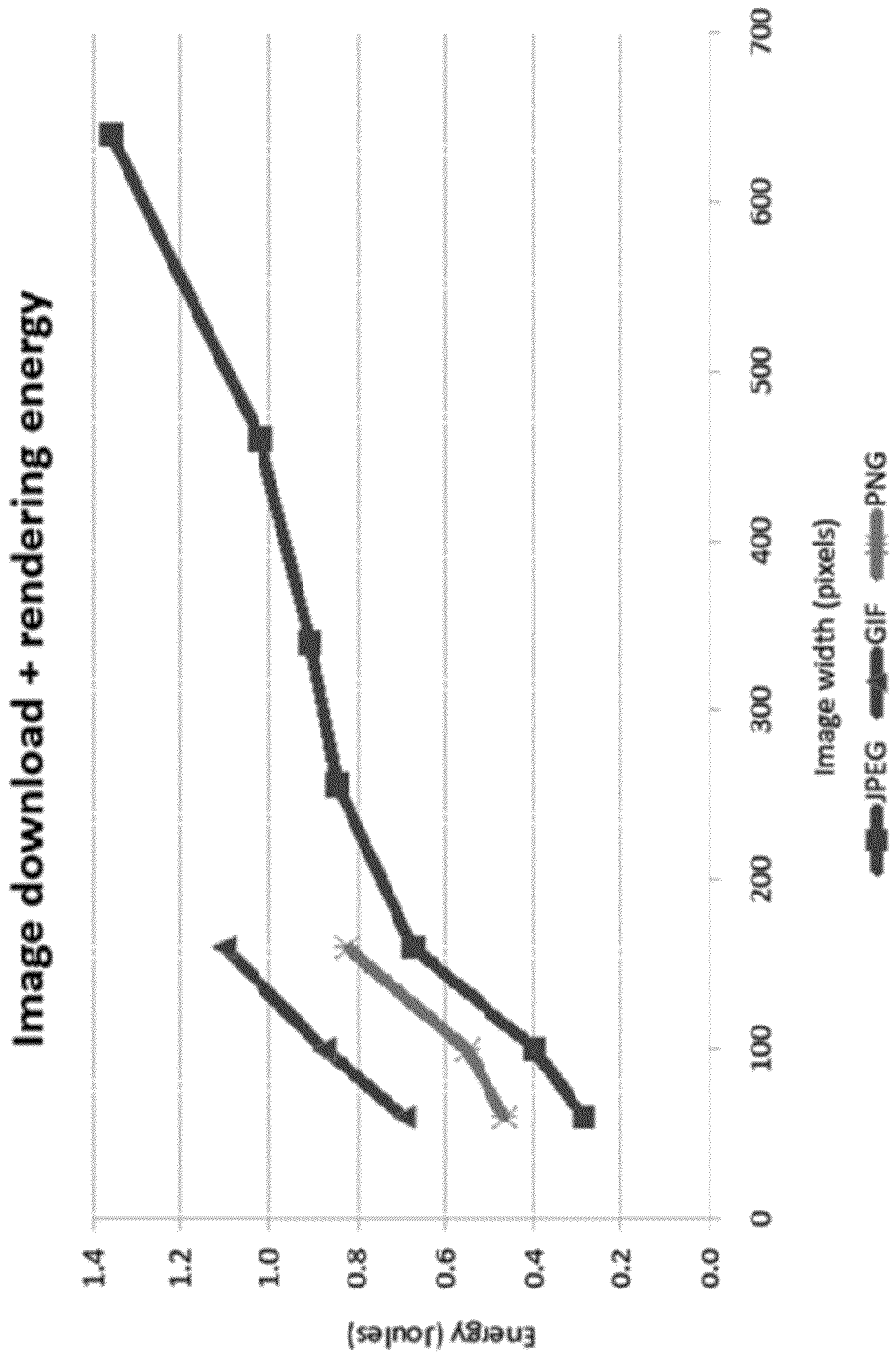
FIG. 12 shows the energy consumption for image formats.

FIG. 12 shows the energy consumption needed to download and render images of different sizes in the three formats on the Android phone. This experiment used a JPEG image of dimensions 1600×1200 and size 741 kB. Smaller images of different height and width are cropped from this image as shown on the x-axis. The cropped images were then saved as JPEG, GIF and PNG. Each image was then embedded in a web page that contained the image and nothing else. Energy needed to download and render each image is measured for all sizes shown on the x-axis with the energy along the y-axis. Since GIF and PNG are generally only used for small images, the trials were performed with these formats only for small images. FIG. 12 shows that JPEG is the most energy efficient format on the Android phone for all image sizes. To further confirm these results, Mogrify was used to convert all images on the Amazon and Facebook pages to JPEG using a standard 92% quality compression measure. The energy consumption for rendering the resulting images from cache relative to the original images was then determined as shown below in Table 2.

TABLE 2

Potential energy savings with JPEG format

| Site | Amazon (Joules) | Facebook (Joules) |
|---|---|---|
| Original | 2.54 | 3.43 |
| JPEG | 2.04 | 2.39 |
| Savings | 20% | 30% |

Table 2 shows that both Amazon and Facebook can conserve energy on Android phones by converting all their images to JPEG, without impacting the visible quality of the images. The reason for the savings is that JPEG compresses the images better and is faster to render then PNG and GIF.

In addition to the principles described above, another idea for minimizing the power consumed by a mobile device is to offload heavy computations to a server cloud and have the phone display the results (as described in E. Cuervoy et al.). In the context of web browsing, one could offload image rendering—including decompression and conversion to a bitmap—to the cloud and have the phone simply display the resulting bitmap. Some browsers, such as Opera and SkyFire, take this approach. Those phone browsers talk to the web through a proxy that does most of the heavy lifting of rendering the page.

Generally speaking, there are two approaches to offloading computation:
- Front-end proxy: a web proxy examines all traffic to the phone and partially renders the page to save work for the phone. Here the proxy decides how the content should be modified before it is sent to the phone. This approach was previously used by old WAP gateways as they translated HTML to WAP. This approach is also used by Opera and SkyFire, but is not used by the default Android or iPhone browsers.
- Back-end server: the phone downloads web content as is, but then offloads certain operations to a server farm. Here the phone decides what needs to be offloaded.

Measurements and principles corresponding to both approaches will be discussed in further detail below.

Figure 13:
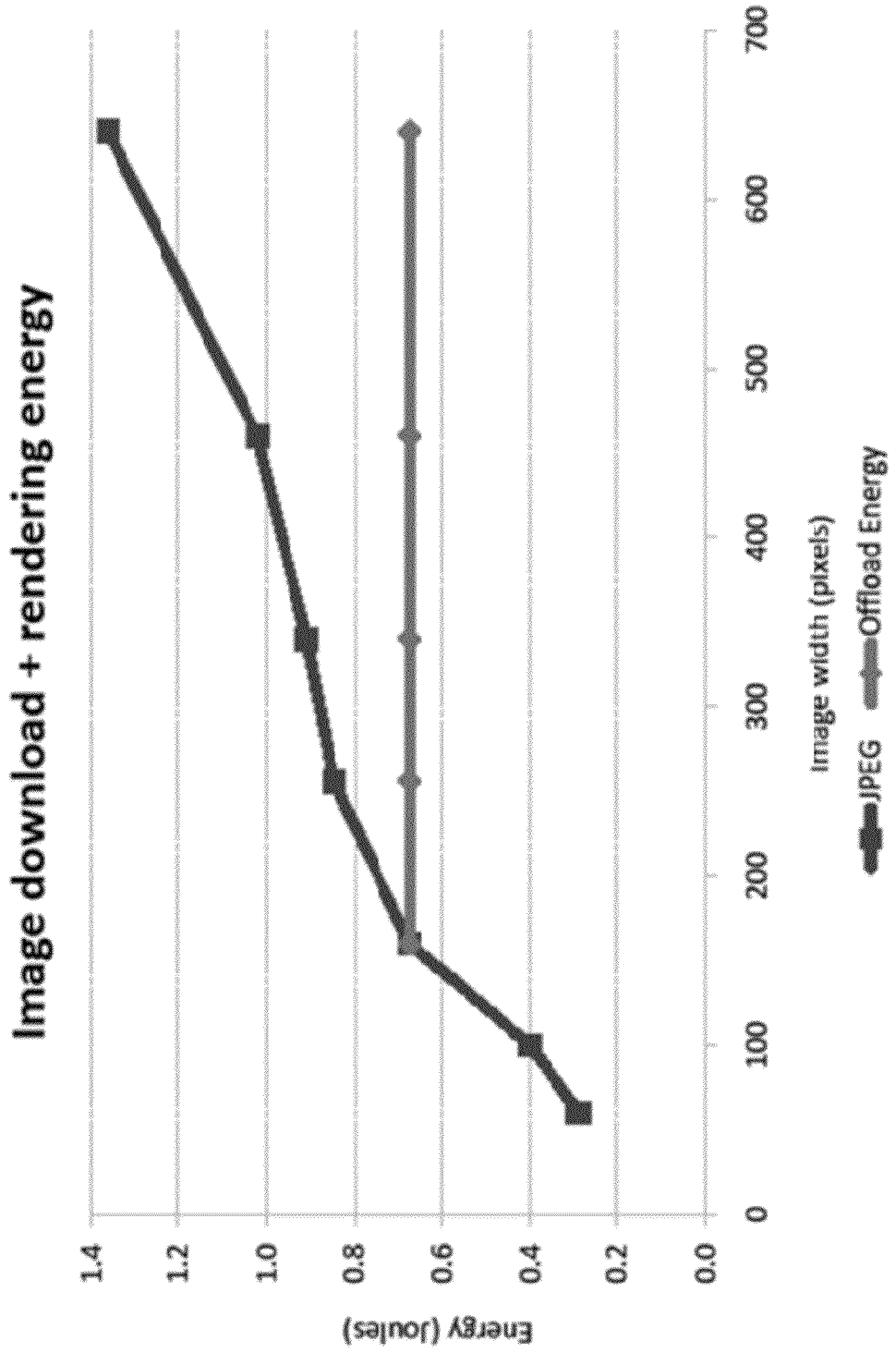
FIG. 13 shows the benefits of offloading images.

First, with respect to offloading via a front-end proxy, some sites, like apple.com, do not have a mobile version. Phones visiting these sites unnecessarily download large images. A natural application for a front-end proxy is to resize images to fit the phone screen, thereby saving radio use and rendering work. The natural place for a front-end proxy is at the carrier's data center where the carrier can optionally play the role of the proxy. FIG. 13 shows the energy savings that result from a front-end proxy that down scales all large JPEG images to 160 pixel width. The darker line is the energy needed to download JPEG images of various sizes when no front-end proxy is used. This line is generated using the same cropping setup described in relation to FIG. 12. The lighter line shows the power consumed (and the savings) from utilizing a front-end proxy. Since all images larger than 160×160 are scaled down by the proxy, the energy consumed by the phone beyond that image size is flat. The area between the darker line and the lighter line represents the energy savings on the phone. On the Apple home page, for example, this front-end proxy would save 1.77 Joules on every page load with little impact to the user experience.

It will be appreciated that down-scaling may also have a few disadvantages. By down-scaling images, users lose the ability to quickly zoom in on intricate image details. Instead, a zoom-in requires downloading the zoomed part of the image. However, in most cases zooming is not required. Another possible disadvantage is that for content sent encrypted using SSL, the proxy cannot see the content and therefore cannot down-scale it (this is not a problem with down-scaling clear text HTTP content). In view of these specific situations in which down-scaling may be undesirable, down-scaling can be offered as an opt-in/opt-out option to users to improve the browsing experience on the phone.

Second, with respect to offloading via a back-end proxy, the phone browser sends sub-tasks to a back-end server. For images, for example, the cost of loading a compressed image and converting it to a bitmap can be offloaded. In this example CPU work is being potentially reduced at the cost of increasing use of the radio. Evaluating whether this trade-off is worthwhile should be done in the context of the following expected trends as technology continues to improve: CPU energy consumption per instruction will continue to drop, and the energy needed to transmit or receive one byte from the phone to the base station will stay roughly constant in comparison. The first assumption is a qualitative version of Moore's law. The second assumption is due to the laws of physics: the energy needed to reach a base station at a certain distance is "roughly" constant (i.e., that transmission energy will likely drop at a far slower pace than the rate of drop in CPU energy). Given these two trends, it should be clear that offloading is not viable in the long run if it results in more radio use. In fact, as CPU energy per instruction decreases it is far better to maximize the amount of computation on the phone in order to minimize use of the radio.

Nevertheless, it is possible that with current technology offloading image rendering to a back-end server saves energy. If so, then one could envision an architecture where the phone sends an image URL to a back-end server. The back-end server retrieves the image, converts it to a plain bitmap, and sends the result to the phone. The phone simply copies the bitmap to its video buffer. To test whether this architecture saves energy, the cost of fetching and rendering compressed JPEGs and PNGs to full bitmaps (BMP) was compared. In an experiment, all the images on an Amazon page were converted to one of JPEG, PNG or BMP. Then, the cost of rendering the images on the page from cache for each of the three formats was measured. The results are shown in Table 3.

TABLE 3

| Energy to render all the images in Amazon page in multiple formats | | |
|---|---|---|
| Amazon images converted to: | Page size (kB) | Energy (mJ) |
| JPEG | 26.45 | 224.68 |
| PNG | 65.53 | 268.05 |
| Bitmap (BMP) | 75.19 | 362.49 |

As already suggested in FIG. 12, Table 3 shows that JPEG is by far the most efficient encoding and PNG is the second. BMP is by far the worst even though it requires no decompression. The reason BMP does so poorly is likely because BMP images are considerably bigger, and the extra energy needed to keep the radio on far outweighs the cost of decompressing the image. Furthermore, based on this experiment, it was determined that back-end offloading of image rendering is not viable even with today's technology.

It will be appreciated that embodiments of the present invention provide a framework for measuring the power consumption of web pages, including specific components on the page. This approach provides another dimension for evaluating mobile web sites and helps web developers build more energy efficient sites. Based on the specific trials and experiments discussed herein, a few guidelines for designing energy efficient web sites are provided below:
- JPEG is the best image format for the Android browser and this holds for all image sizes.
- Gmail, the most "green" mobile site we found, uses HTML links to open email messages that the user clicks on. The desktop version of Gmail uses Javascript instead. Using links instead of Javascript greatly reduces the rendering energy for the page. Thus, by designing the mobile version of the site differently than its desktop version, Gmail was able to save energy on the phone.
- There were a number of static pages that could have been locally cached and displayed without any network access. Unfortunately, these sites link to Google Analytics, a tool that helps monitor site usage. Javascript used by Google Analytics forces a dynamic network request that cannot be cached. Thus, even though the site could have been rendered from cache, the phone still has to pay the high cost of setting up a 3G session. Thus, web developers need to understand the cost of linking to these third party tools. A possible solution may be to have browsers expose the state of the radio to Javascript, and Google Analytics could choose not to report usage if the 3G radio is in low-power mode.

AOL is able to save rendering energy by using a simple HTML table element to position elements on the page. Other sites that position elements using CSS need far more energy to render.

On all the mobile sites examined above, ads were small JPEG files and had little impact on overall power usage.

Sites like apple.com are particularly energy hungry. Visiting such sites that have not been optimized for access on a mobile phone end up draining the batteries of the mobile phones that visit the site. This can potentially reduce traffic to the site.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for measuring power consumption by a mobile device corresponding to access of web pages, the system comprising:
    the mobile device, configured to access web pages via a wireless network;
    a power measurement device connected to a battery of the mobile device, configured to measure parameters related to power consumption; and
    a server, in communication with the mobile device and the power measurement device, configured to control the mobile device's access of web pages and control the power measurement device's measurement of parameters, to receive measurements from the power measurement device, and to process the received measurements;
    wherein the server is further configured to determine an amount of power consumed by the mobile device with respect, to an individual web element of a web page by:
        generating a copy of the web page at the server;
        instructing the mobile device to access the copy of the web page at the server and determining an amount of power consumed by the mobile device corresponding to the mobile device's access of the copy of the web page at the server;
        generating a modified copy of the web page at the server missing the individual web element;
        instructing the mobile device to access the modified copy of the web page at the server and determining an amount of power consumed by the mobile device corresponding to the mobile device's access of the modified copy of the web pane at the server; and
        determining a difference between the amount of power consumed by the mobile device corresponding to the mobile device's access of the copy of the web page at the server and the amount of power consumed by the mobile device corresponding to the mobile device's access of the modified copy of the web page at the server.

2. The system of claim 1, wherein the mobile device is configured to access the copy of the web page at the server with a clear cache.

3. The system of claim 1, wherein the server is further configured to:
    instruct the mobile device to cache the copy of the web page and the modified copy of the web page; and
    obtain an amount of power consumed by the mobile device corresponding to the mobile device's access of the cached copy of the web page from the power measurement device;
    obtain an amount of power consumed by the mobile device corresponding to the mobile device's access of the cached modified copy of the web page from the power measurement device; and
    determine a difference between the amount of power consumed by the mobile device corresponding to the mobile device's access of the cached copy of the web page and the amount of power consumed by the mobile device corresponding to the mobile device's access of the cached modified copy of the web page.

4. The system of claim 1, wherein the mobile device is configured to access the web page via an Android browser and is further configured to execute a browser profiler application to manage a cache of the mobile device.

5. The system of claim 4, wherein the Android browser is configured to cache all components of the web page.

6. The system of claim 4, wherein the Android browser is configured to clear the cache programmatically.

7. The system of claim 4, wherein the Android browser is configured to ask for user permission to start loading a web page, and the power measurement device begins measuring after the Android browser receives user permission.

8. The system of claim 4, wherein the Android browser stores a list of component URLs that are downloaded over the wireless network as part of rendering the web page.

9. A method for measuring power consumption by a mobile device corresponding to accessing an individual web element of a web page, the method comprising:
    generating, by a server, a copy of the web page;
    instructing, by the server, the mobile device to access the copy of the web page at the server;

obtaining, by the server, a measurement of an amount of power consumed by the mobile device corresponding to the mobile device's access of the copy of the web page at the server from a power measurement device connected to a battery of the mobile device and configured to measure parameters related to power consumption;

generating, by the server, a modified copy of the web page missing the individual web element;

instructing, by the server, the mobile device to access the modified copy of the web page at the server;

obtaining, by the server, a measurement of an amount of power consumed by the mobile device corresponding to the mobile device's access of the modified copy of the web page at the server from the power measurement device; and determining, by the server, a difference between the amount of power consumed by the mobile device corresponding to the mobile device's access of the copy of the web page at the server and the amount of power consumed by the mobile device corresponding to the mobile device's access of the modified copy of the web page at the server.

10. The method of claim 9, wherein the mobile device accesses the copy of the web page at the server over a wireless network.

11. The method of claim 9, wherein the method further comprises:

instructing the mobile device to cache the copy of the web page and the modified copy of the web page; and obtaining an amount of power consumed by the mobile device corresponding to the mobile device's access of the cached cony of the web page from the power measurement device;

obtaining an amount of power consumed by the mobile device corresponding to the mobile device's access of the cached modified copy of the web page from the power measurement device; and determining a difference between the amount of power consumed by the mobile device corresponding to the mobile device's access of the cached copy of the web page and the amount of power consumed by the mobile device corresponding to the mobile device's access of the cached modified copy of the web page.

12. A server for measuring power consumption by a mobile device corresponding to accessing an individual web element of a web page, the server having a non-transitory computer-readable medium with computer-executable instructions stored thereon, the computer-executable instructions comprising instructions for:

generating a copy of the web page;

instructing the mobile device to access the copy of the web page at the server;

obtaining a measurement of an amount of power consumed by the mobile device corresponding to the mobile device's access of the copy of the web page at the server from a power measurement device connected to a battery of the mobile device and configured to measure parameters related to power consumption;

generating a modified copy of the web page missing the individual web element;

instructing the mobile device to access the modified copy of the web page at the server;

obtaining a measurement of an amount of power consumed by the mobile device corresponding to the mobile device's access of the modified copy of the web page at the server from the power measurement device; and determining a difference between the amount of power consumed by the mobile device corresponding to the mobile device's access of the copy of the web page at the server and the amount of power consumed by the mobile device corresponding to the mobile device's access of the modified copy of the web page at the server.

13. The server of claim 12, wherein the instructions for instructing a mobile device to access a web page are instructions for instructing a mobile device to access the copy of the web page over a wireless connection.

14. The server of claim 12, wherein the computer-executable instructions further comprise instructions for:

instructing the mobile device to cache the copy of the web page and the modified copy of the web page; and obtaining an amount of power consumed by the mobile device corresponding to the mobile device's access of the cached copy of the web page from the power measurement device;

obtaining an amount of power consumed by the mobile device corresponding to the mobile device's access of the cached modified copy of the web page from the power measurement device; and determining a difference between the amount of power consumed by the mobile device corresponding to the mobile device's access of the cached copy of the web page and the amount of power consumed by the mobile device corresponding to the mobile device's access of the cached modified copy of the web page.

* * * * *